(12) United States Patent
Yafuso

(10) Patent No.: US 7,648,248 B2
(45) Date of Patent: Jan. 19, 2010

(54) OPTICAL ENERGY DIRECTOR USING CONIC OF ROTATION (COR) OPTICAL SURFACES AND SYSTEMS OF MATCHED CORS IN THE CLAIMS

(76) Inventor: Eiji Yafuso, 4937 Avila Ave., Carlsbad, CA (US) 92008

( * ) Notice: Subject to any disclaimer, the term of this patent is extended or adjusted under 35 U.S.C. 154(b) by 5 days.

(21) Appl. No.: 11/653,453

(22) Filed: Jan. 16, 2007

(65) Prior Publication Data

US 2008/0170311 A1 Jul. 17, 2008

(51) Int. Cl.
*G02B 5/08* (2006.01)

(52) U.S. Cl. ............ 359/851; 359/399; 359/857; 359/864; 359/888

(58) Field of Classification Search ......... 359/850–851, 359/857–864, 399, 868
See application file for complete search history.

(56) References Cited

U.S. PATENT DOCUMENTS 5,574,601 A * 11/1996 Hall ..................... 359/859
6,231,199 B1 * 5/2001 Li ....................... 359/857

\* cited by examiner

*Primary Examiner*—Stephone B Allen
*Assistant Examiner*—Jennifer L. Doak

(57) ABSTRACT

An ultracompact, lightweight, reflective telescope is described which has no loss due to central obscuration for a beam being projected from its focus. The optical surfaces are composed of matched conics of rotation.

41 Claims, 9 Drawing Sheets

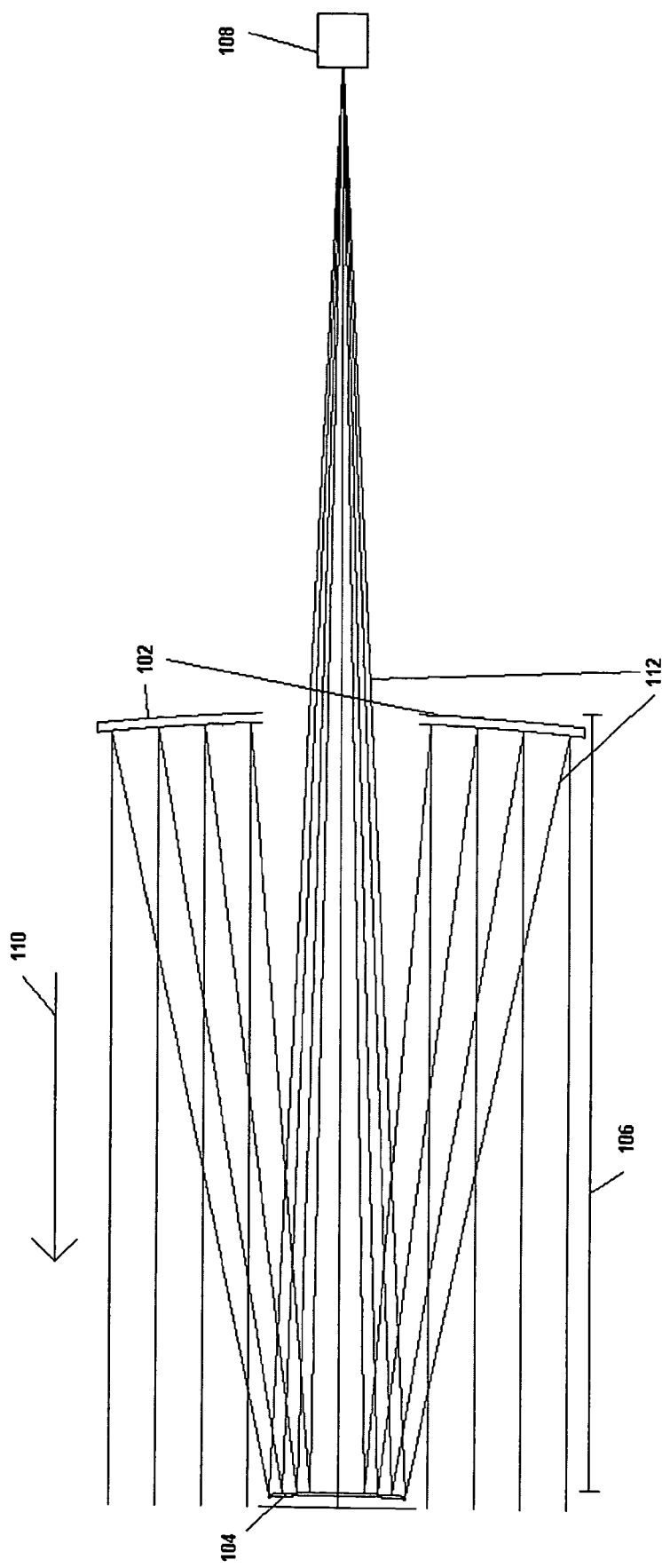

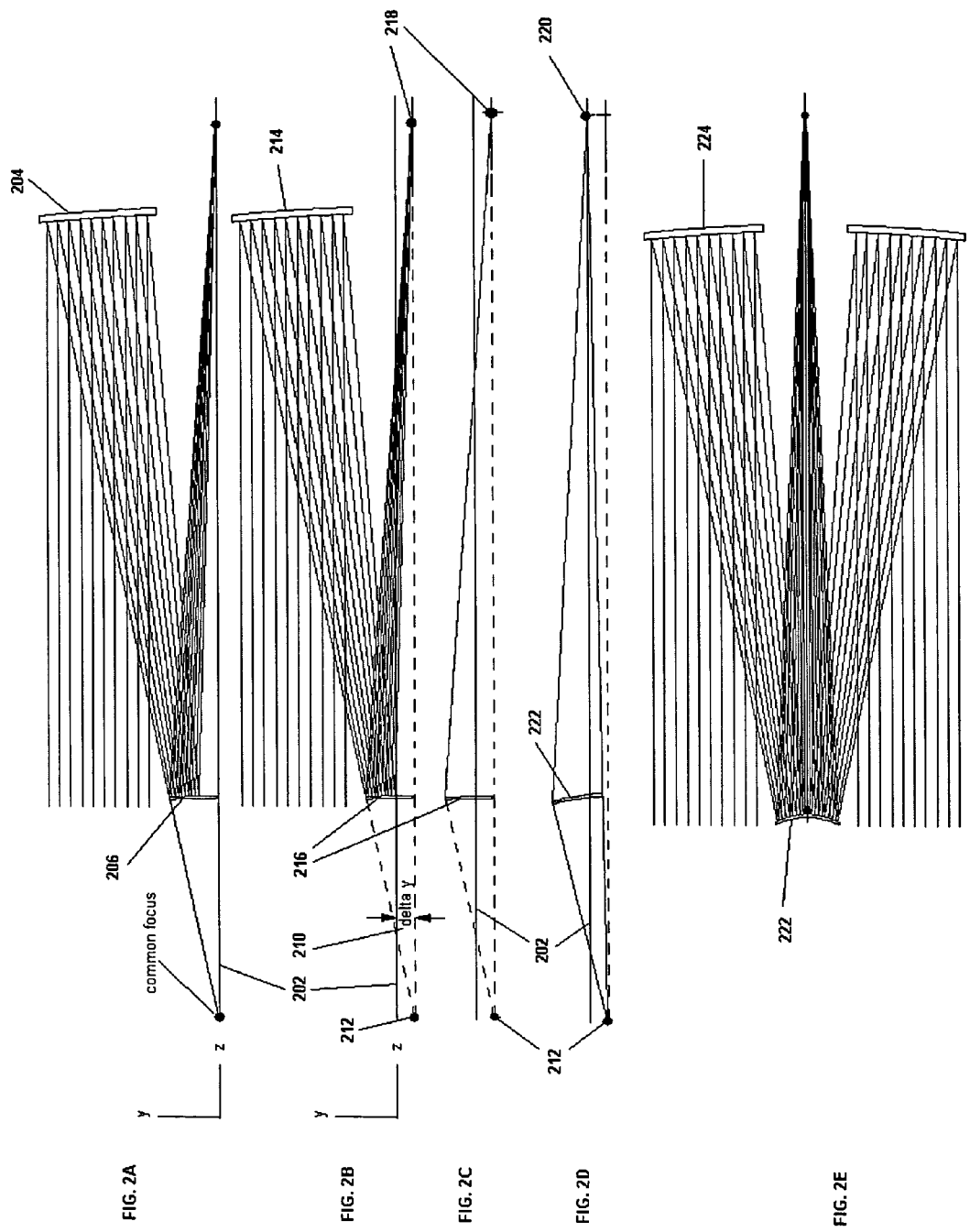

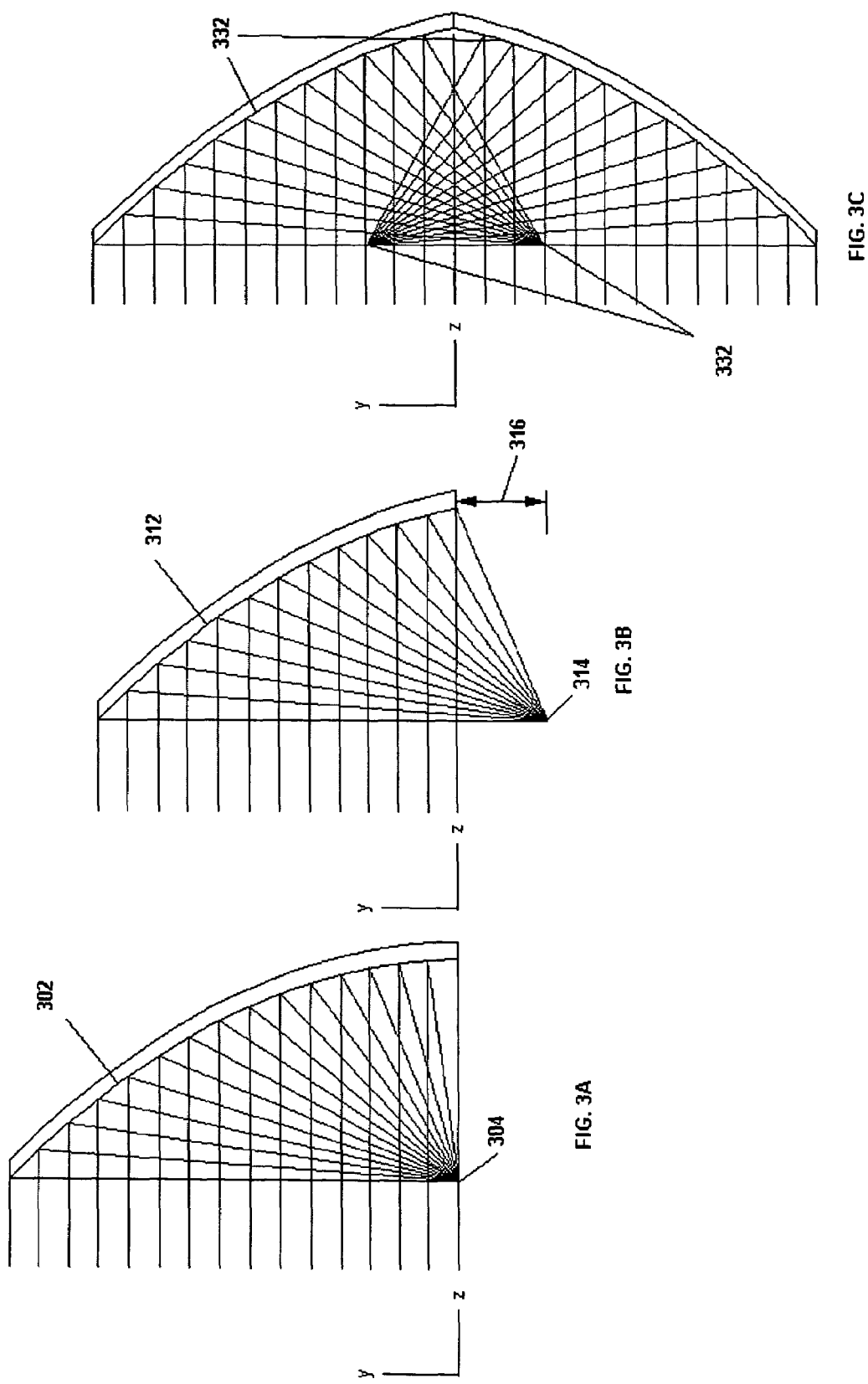

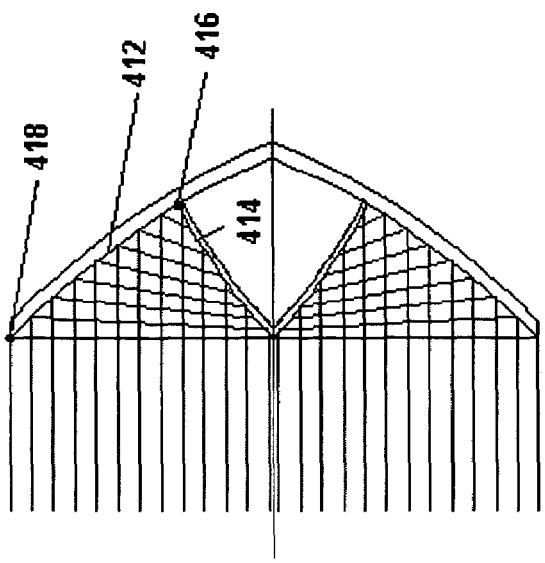
FIG. 4C
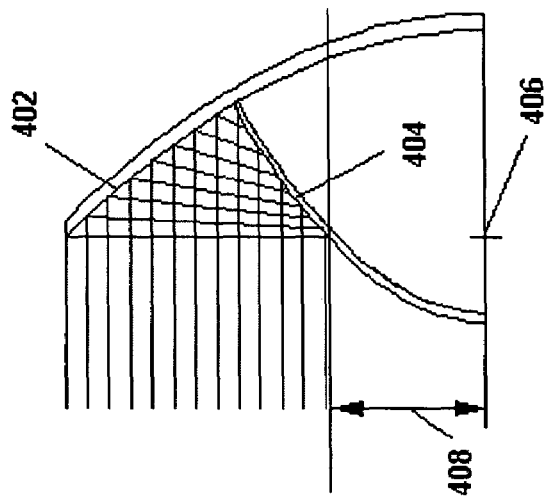
FIG. 4B
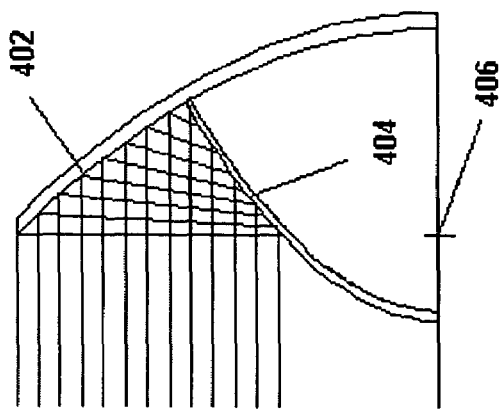
FIG. 4A
FIG. 4

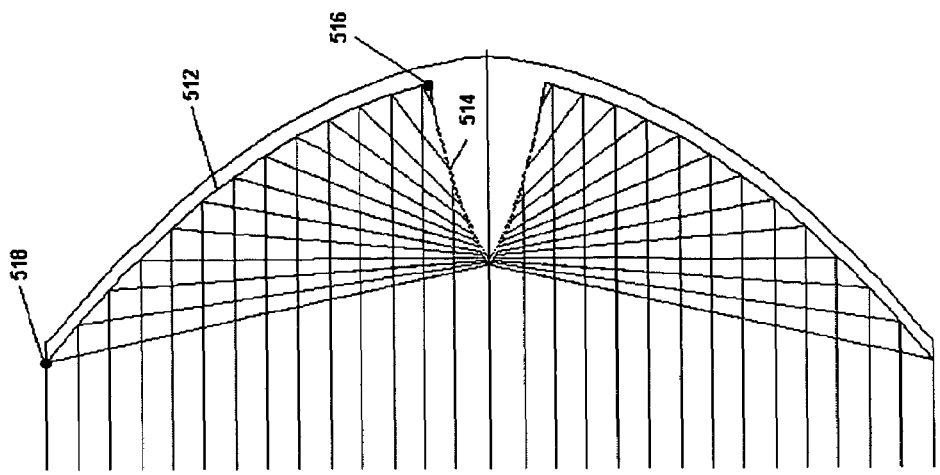
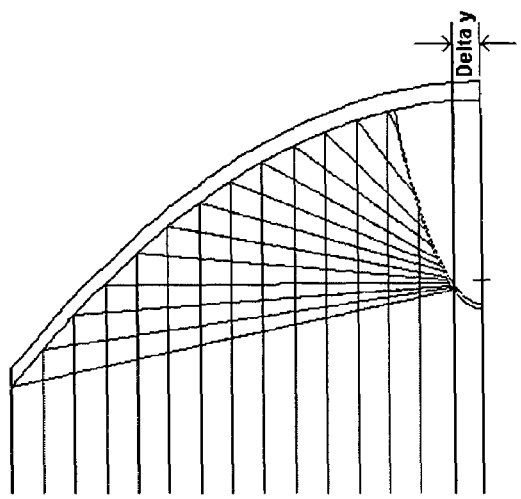
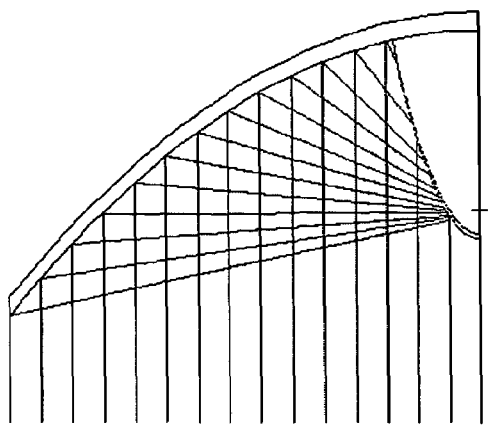
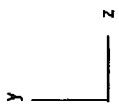

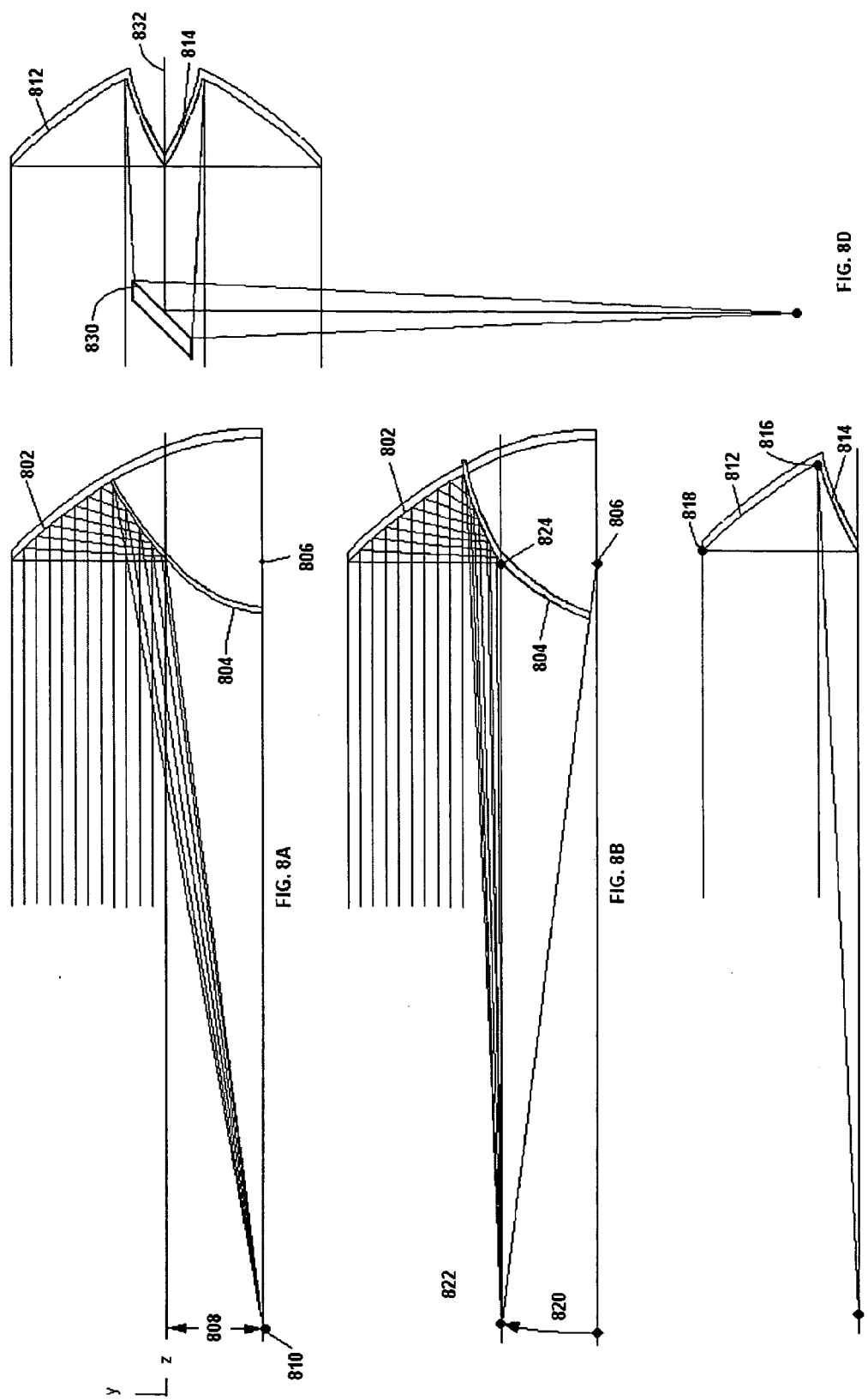

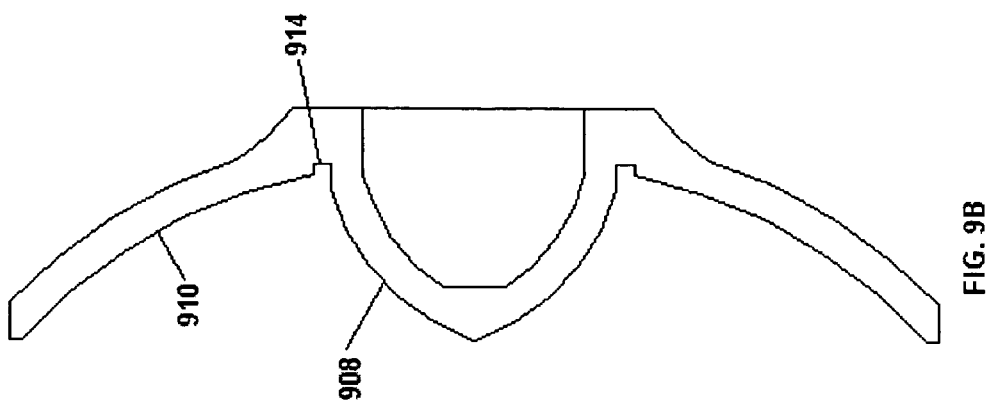
FIG. 9B
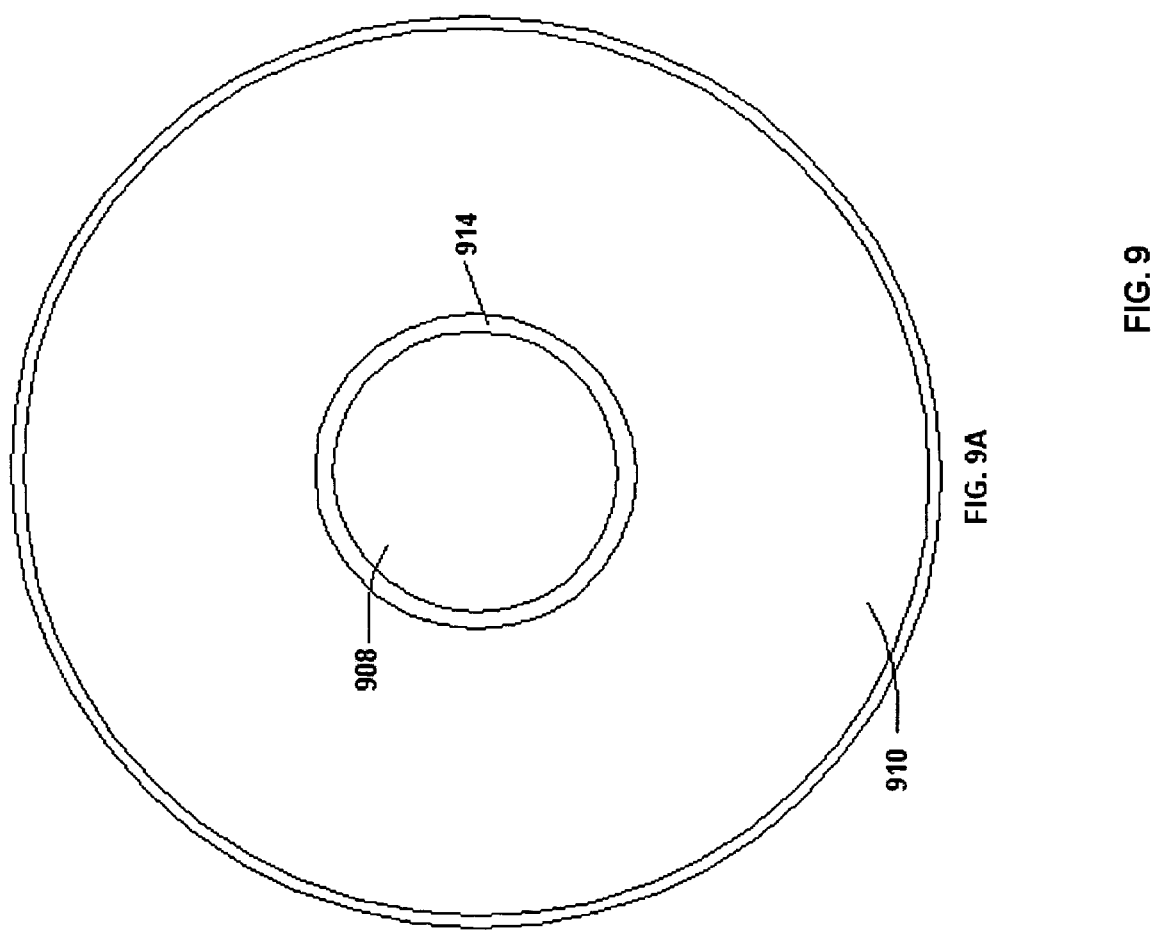
FIG. 9A
FIG. 9

OPTICAL ENERGY DIRECTOR USING CONIC OF ROTATION (COR) OPTICAL SURFACES AND SYSTEMS OF MATCHED CORS IN THE CLAIMS

BACKGROUND

1. Field

The present invention relates generally to optical systems, and more specifically to a high-efficiency beam director for use in telescopes or laser projection systems.

2. Background

A beam director directs light between a beam, such as light emanating from a distant source, and an image point. When used to collect light from a distant source and focus the light on a focal surface, a beam director can be used as a telescope. When used in the other direction, for example to propagate light collected from a point source to a distant target, a beam director can be used in other ways, such as for laser communications, laser target designation, and projection of directed energy laser weapons. In most applications, it is desirable for a beam director to maintain the lowest possible loss of the energy during propagation, both within and outside the beam director. Lowest loss of energy corresponds to highest efficiency. For clarity, efficiency is defined here as the ratio of usable light energy out of an optical system to the light energy into said optical system. Usable light energy excludes light that exits the system and is lost because of diffusion, scattering, etc.

Telescopes collect light from a distant source and focus that light onto a focal surface for viewing. To collect the same amount of light, a less efficient telescope must generally be made larger than a more efficient telescope to compensate for lost light. Similarly, a beam director used to project light from a point source over a long distance (in the opposite direction as a telescope) should be as efficient as possible. Loss of light energy during propagation can mean that the optical system must be larger, or the laser light source more powerful, than would otherwise be necessary to achieve the same resultant light energy at the distant target. Thus, efficiency is a key characteristic for building compact beam director systems.

Many existing telescope systems, such as Ritchey-Cretien, Cassegrain, Maksutov, Gregorian, and Schmidt optical systems, as well as other catoptric or catadioptric variants, employ two mirrored surfaces, commonly referred to as the primary mirror and the secondary mirror. These systems are referred to herein as "two-mirror systems." Two-mirror systems share several disadvantages. First, the two mirrors must be designed and formed to match each other. Specifically, the optical characteristics of the two conic surfaces (e.g., curvatures, conic constants, aperture diameters, relative positions, absolute orientation, and other optical characteristics) must be complementary. For example, in a classical Cassegrain telescope, the two mirror system may be composed of conic surfaces such as a large concave primary parabola and a small convex secondary hyperbola. Any change in optical characteristics of one mirror but not the other may cause a mismatch that will degrade the operation of the system. In addition, any irregularities in the primary or secondary mirrors, such as ordinarily incident to manufacturing, may cause additional loss of light energy. Finally, even primary and secondary mirrors that are designed and formed accurately must be precisely aligned with each other to achieve maximal performance. Any misalignment causes loss of light energy. Lastly a standard two-mirror system has a central obscuration in the center of its optical path. In a system that projects light from a laser light source to a distant target, this can result in the loss of light from the center of the laser light beam. Loss of light from the center of the laser light beam is very important, because the light emitted from many laser light sources is most intense at the center. In such a system, the portion of the laser light beam having the greatest light energy density is wasted.

There is therefore a need in the art for a highly compact, lightweight beam director having high efficiency and little or no loss of light by the central obscuration. There is further a need for such a system to be robust to misalignment.

SUMMARY

Embodiments disclosed herein address the above stated need by utilizing an optical surface consisting of matched conics of rotation. A conic of rotation is a conic function generated in the y-z plane, which may be offset and/or tilted with respect to the z-axis, and then rotated about the z-axis to form a three-dimensional surface. As disclosed herein, an optical system employing matched conics of rotation can be constructed so as to have little or no lost light from the central obscuration when used as a projection system. As further disclosed herein, an optical system employing matched conics of rotation can be further constructed to provide both primary and secondary reflective surfaces within a single, one-piece substrate that is robust to misalignment.

BRIEF DESCRIPTION OF THE DRAWINGS

FIG. 1 is a cutaway view of a Cassegrain telescope;

FIG. 2 illustrates matched CoRs formed from a Cassegrain telescope;

FIG. 3 illustrates CoR construction from a parabola;

FIG. 4 is a beam director composed of matched CoRs;

FIG. 5 is a beam director or telescope of matched CoRs;

FIG. 8 is a beam director or telescope formed of matched CoRs constructed from a parabola and hyperbola.

FIG. 9 is a beam director or telescope formed of matched CoRs using a single substrate.

DETAILED DESCRIPTION

Figure 6:
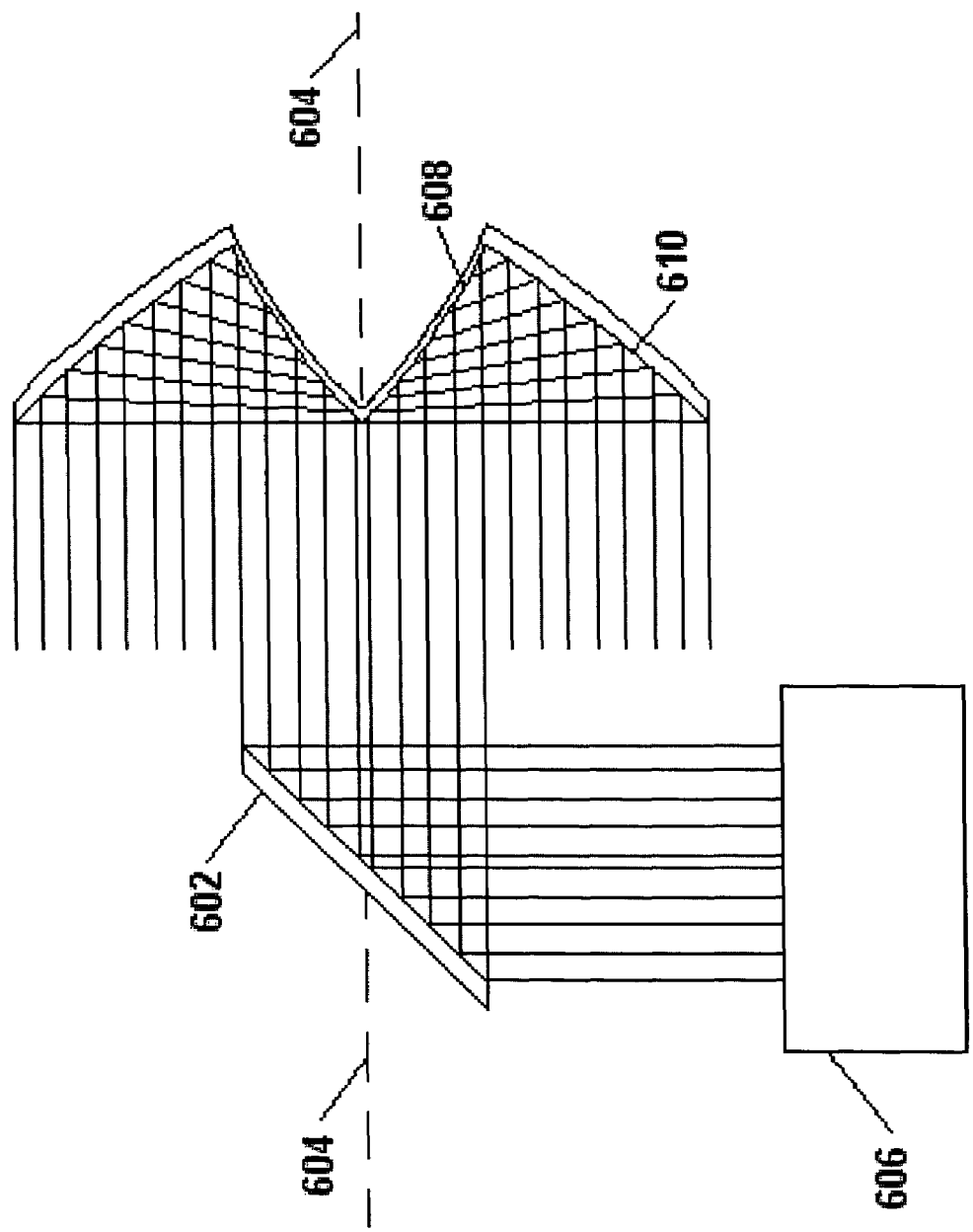
FIG. 6 is an application of matched CoRs as a source director.

An optical system is characterized by several parameters, including the diffraction limit, the transmitting aperture, and the diffraction-limited spot size. The diffraction limit determines the ability of an optical system to concentrate light energy within a target area at a given distance. The aperture, for the purposes of beam directors as described herein, is the surface which physically limits the size of the incoming or outgoing beam bundle. The diffraction-limited spot size is the smallest physically realizable image of a point source, and may be easily calculated using equations known to one of skill in the art from the aperture, source wavelength, and distance to the image plane. For a system with a circular aperture, the diffraction limited spot size at a given distance is inversely related to the diametric size of the transmitting aperture. In order to project an optical beam onto a target, such as a communications receiver or directed energy target, it is desirable to minimize the size of the diffraction-limited spot at the target.

The generating function for a generalized conic section can be defined by Equation 1 below, where the z-axis represents both the optical axis and axis of symmetry, c is the optical surface curvature equal to one over its radius, and r is the radial independent coordinate equal to the shortest distance between from a point on the section and the z-axis.

$$z = \frac{cr^2}{1 + \sqrt{1 - (1+k)c^2 r^2}} \quad \text{Equation 1}$$

Under this definition, k>0 denotes an oblate spheroid, k=0 a sphere, 0>k>−1 an ellipse, k=−1 a parabola, k<−1 a hyperboloid. A 1-dimensional conic function in the y-z plane as described in paragraph 1006 can be generated by replacing r with y in Equation 1 and evaluating over positive y.

Catoptric optical systems are those composed of reflective optical elements. Catadioptric optical systems are those composed of a combination of reflective and refractive optical elements. Dioptric optical systems are those composed of refractive optical elements. Generalized conic sections are regularly utilized in the construction of both catoptric and catadioptric telescopes. Among the more well known telescope system architectures are 1) the (catoptric) Ritchey-Cretien/Cassegrain, which utilizes a concave hyperbolic/parabolic primary with a convex hyperbolic secondary, 2) the (catoptric) Gregorian, which utilizes positive and negative ellipsoids, and 3) the (catadioptric) Schmidt, which utilizes a refractive corrector with a spherical primary. By careful placement of the conic foci of the two surfaces with respect to each other, an optical system can be formed that has a large aperture and a very long focal length, in addition to excellent aberration performance.

As discussed above, two-mirror systems include Ritchey-Cretien, Cassegrain, Maksutov, Gregorian, and Schmidt systems, as well as other catoptric or catadioptric variants. These systems are generally composed of a large primary mirror working in conjunction with a smaller secondary mirror. The relatively high efficiency of such optical systems means that a relatively small system can provide large beam expansion when employed in the opposite direction as a telescope. One measure of performance of optical systems is the aspect ratio, defined as the ratio of the length of the optical system to its aperture's cross-sectional dimension (e.g., diameter or radius). For a system having a circular aperture, the aspect ratio is the ratio of length of the optical system to the diameter of the aperture.

FIG. 1 illustrates a cutaway view of an exemplary Cassegrain type telescope configuration. It consists of a concave primary mirror (102) and convex secondary mirror (104), both conic sections. The two mirrors are set a distance (106) from each other that is selected to minimize aberrations. Used as a laser projector, the source (108) would be placed diverging from the focus of the telescope and then be expanded and projected out along the negative z direction (110). As depicted by the light ray indicators (112), the central portion of the beam is lost as it reflects from the secondary (104) back toward the source (108), missing the primary mirror (102) and therefore failing to be projected out of the system. Note that since the system expands the beam while reflecting it between the two mirrors (102 and 104), the system has a good aspect ratio relative to the degree of beam expansion. The aspect ratio in this exemplary configuration is approximately 2:1. In other words, the output aperture is approximately half the length of the telescope.

One disadvantage of the exemplary Cassegrain configuration shown in FIG. 1, and with other two-mirror systems, is the central obscuration formed by the secondary mirror (104). Because the secondary mirror (104) obscures and blocks light passing through the center of the beam, such two-mirror systems can never approach 100% efficiency when used to expand and project light, even in a vacuum.

A difficulty with this kind of system used as a beam expander is the sensitivity of the beam quality to any misalignment of the two mirrors (102 and 104) with respect to each other and with respect to the system focal point (108). The spatial relationship between the two mirrors (102 and 104) is commonly maintained by way of a metering structure (not shown) which must hold the mirrors (102 and 104) with sufficient stability and precision to prevent misalignment during use. The metering structure must be carefully designed to remain as stable as possible under varying temperatures, shock, vibration, and other environmental hazards that can occur during deployment. Metering structure design and engineering requires expertise in several areas including materials and properties, stress and thermal analyses, and machine tolerancing. A well designed system can generally provide optical stability for a finite and predefined range of environmental conditions.

A laser communication system often utilizes a semiconductor laser as its transmitting source. These and other lasers often operate in modes which place the greatest intensity of light energy (light energy density) in the center of the beam emanating from the laser source. Projecting such lasers using a two-mirror configuration such as a Cassegrain configuration can cause substantial loss of laser light, because the portion of the beam having the greatest light energy density is the very portion that is lost. In a Cassegrain beam director, for example, the diametric ratio (the ratio of diameters of secondary mirror to primary mirror) is typically 30%. So approximately the center third of the diameter of the beam is lost, and with it the most intense portion of the transmitted light.

Another approach to expanding an optical beam for distant projection is to use dioptric (refracting lens) systems. Though dioptric systems generally have no central obscuration, they do suffer 3 significant drawbacks: 1) they are very difficult to make compact, 2) they tend to be heavier, and 3) they have optical surfaces involving multiple instances of light reflection and refraction, each potentially losing light as a result of aberrations, scattering, and absorption. Furthermore, the designer of a dioptric beam director to be used for a laser weapon must also consider the optical lens materials' ability to withstand the energy density of the laser radiation. Absorption of too much laser light can damage or even destroy a lens or its coating in a dioptric beam director.

A Conic of Rotation (CoR) is a one-dimensional conic function generated in the y-z plane, which is generally displaced (i.e., offset and/or tilted with respect to the z-axis) and then rotated about the z-axis to form a curved 3-dimensional surface. The z-axis represents the axis of symmetry for both a conic and a CoR, and the offset can be thought of as being in the y-axis direction with the tilt being about an axis parallel to the x-axis. A system of matched CoRs is one in which two surfaces are used, acting together to form an optical system. Matched CoRs can be constructed so as to eliminate the loss of energy from the center of a transmitted beam. Furthermore, a pair of matched CoRs may be manufactured from a single substrate such that no subsequent alignment of the CoRs is necessary. The accuracy of alignment of a pair of CoRs is limited by manufacturing tolerances, rather than by subsequent alignment or maintenance of subsequent alignment.

As known to one of ordinary skill in the art, an optical conic surface generally has two conjugate focal points, where conjugate means that light from a point source located at one focal point, after traversing the optic, will either converge to, or appear to radiate precisely from, the conjugate focus. For example, a parabola has one focal point at infinity. Axial light (i.e., light emanating from a point along the axis of the optic) from an infinitely distant point source striking a concave parabola will be reflected to the conjugate focal point a finite distance away from the parabola. For a convex parabola, light from the infinitely distant object will, upon reflection, appear to emanate from a point located at the conjugate focus.

An illustrative way to define the optical surface of an embodiment of a conic of rotation is by the following steps: Part of a first conic section is formed according to equation 1 evaluated over positive r. The y-z plane represents the tangential plane, and its intersection with the conic section forms a 2-dimensional curve. To form a conic of rotation this 2-dimensional curve is now offset in the negative y direction by an amount, delta y, and then rotated about the z-axis to form a 3-dimensional surface. The result is a first conic of rotation having conjugate focal rings instead of conjugate focal points. The radii of the focal rings' will be equal to the offset, delta y. Alternatively, a CoR may be defined so as to have conjugate focal rings that possess different radii from one another. Begin again by intersecting the tangential plane with a standard conic surface. In addition to the offset, delta y, the curve can also be rotated about a line parallel to the x axis through an offset angle, theta, prior to forming the 3-dimensional surface by rotation about z. For a CoR formed using offset angle, theta, and/or offset in the y direction, the radius of the resultant focal ring(s) will be: $r_f$=delta-y+d sin(theta), where $r_f$ is the radius of the focal ring, delta-y is the offset in the y-axis direction, d is the distance from the focal point to the axis of rotation through theta. This convention assumes that d is positive in the positive z direction and positive theta is measured in a clockwise direction. An example would be a surface which began as a hyperbola and was offset, tilted, and rotated about the z-axis to form a CoR with a focal point whose conjugate was a focal ring.

If a CoR has an intrinsic focal ring, a second conic of rotation with an intrinsic focal ring of equal radius can now be matched to the first, forming a telescope. This is accomplished by positioning the two CoR's with respect to each other such that their focal rings occupy the same position in space.

FIGS. 2A-2E show how the optical surfaces of a Cassegrain beam director can be altered to form matched CoRs to eliminate loss of part of the beam through the central obscuration. FIG. 2A shows the upper portion of a two-dimensional ray trace (in the y-z plane) for a standard Cassegrain beam director. Rotating this 2-dimensional image about the z-axis (202) forms the surfaces of a standard Cassegrain telescope. Rotating the first surface (204) about the z-axis (202) forms the surface of the primary mirror, as shown in FIG. 1 (102). Rotating the second surface (206) about the z-axis forms the surface of the secondary mirror, as shown in FIG. 1 (104). To form matched CoRs, however, both surfaces are offset by an amount, delta y (210), toward the z-axis (202), as shown in FIG. 2B. The displaced secondary surface (216) is hyperbolic. The hyperbolic virtual focus (212) of the displaced secondary surface (216) is located at the focus (212) of the displaced primary surface (214), also displaced by the amount delta y (210) below the z-axis (202). The real focus (218) of the displaced secondary surface (216) is similarly displaced by the amount delta y (210) below the z-axis (202). Rays aimed toward the hyperbolic virtual focus (212) will be reflected to converge at its real focus (218).

FIG. 2C is a simplified diagram showing the virtual ray traveling from the tip of the secondary (216) to the hyperbolic virtual focus (212), and the real ray from the tip of the secondary (216) to the real focus (218). Rotating the primary surface (not shown) and secondary surface (216) about the z-axis (202) results in two circles of radius delta y and with a center at the z-axis—one along the path of the hyperbolic virtual focus (212) and the other along the path of the real focus (218). Any optical surfaces below the z axis due to displacement of delta y are discarded.

As shown in FIG. 2D, the secondary can be rotated about an axis parallel to the x-axis and located at its virtual focus (212) until its real focus moves to a point on the z-axis (220), forming a tilted secondary (222). The primary (not shown) is not rotated, and remains simply displaced by delta y toward the z-axis. In this way the virtual focal circle of the now tilted secondary (222) and the real focus of the primary (not shown) occupy the same position and size in space. Now rotating the primary (not shown) and tilted secondary (222) about the z-axis results in only one circle of radius delta y along the path of the hyperbolic virtual focus (212). Because the new real focus (220) of the tilted secondary (222) lies on the z-axis, rotating the primary around the z-axis does not cause the real focus (220) to move along a circular path or otherwise. In other words, tilting the secondary to form the tilted secondary (222) shown in FIG. 2D reduces the diameter of one of the focal loci located at the real system focus (220) to zero. As shown in FIG. 2E, the lowered primary (224) and the tilted secondary (222) can be truncated below the z-axis and then rotated about the z-axis to form a beam director having no loss of the central portion of the beam due to central obscuration.

FIGS. 3A-3C illustrate an example of construction of a conic of rotation based upon a parabola. FIG. 3A shows a parabolic surface as defined by equation 1 and with the conic constant, k, equal to −1. Rays coming in from an infinitely distant object to the left strike this parabolic surface (302) and are all directed to a common focus (304) located on the axis of symmetry. The image only shows the upper portion of the curve (302). Rotating the curve (302) a complete rotation about the z-axis results in a parabolic dish surface. FIG. 3B shows the same parabolic arc (312) shifted downward in the negative y direction (toward the optical axis), by an amount, delta y (316), and truncating the portion of the parabolic arc (312) extending below the z-axis. As can be seen, the focus (312) moves down with the surface such that now it lies below the z-axis by the same distance, delta y (316). Rotating the parabolic arc (312) about the z-axis results in a conic of rotation (CoR) having the planar cross-section (332) shown in FIG. 3C. Light from an infinitely distant source that reflects from the CoR converges along a locus of foci in the shape of a circle with radius delta y, and centered on the z-axis. Viewed along the y-z plane, the light from the infinitely distant source reflects from the planar cross-section (332) and converges at two foci (322), one located delta y above the z-axis, and the other located delta y below the z-axis. One of skill in the art will understand that a single concave CoR may be used without a matched convex CoR to focus light traveling along a path parallel to the z-axis and hitting the convex CoR onto a loci of foci. The concave CoR may be shaped so as to focus such light onto a circular loci, an elliptical loci, or an arbitrarily-shaped loci.

FIGS. 4A-4C illustrate construction of a beam director using two matching but physically connected CoRs. The beam director of FIG. 4C is composed of matched CoRs formed from conic sections (in this case a positive and negative parabola) and having no light loss by central obscuration when used as a projection system. As described below, the beam director of FIG. 4C could be constructed from a single reflective substrate. In one direction, this beam director could be used to expand and project a laser weapon. In the opposite direction, this beam director could be used as a telescope.

The CoRs are matched by designing them such that both CoRs have the same diameter focal locus, such that when properly positioned with respect to each other, their respective loci precisely coincide in space. FIG. 4A is a 1-dimensional illustration of two parabolas, a concave parabola (402) and a convex parabola (404). Each of the two parabolas (402 and 404) has the same focus in space (406).

In an illustrative embodiment, the concave parabola (402) extends from the z-axis to an edge immediately above the common parabolic focus (406), and the convex parabola (404) extends from the z-axis until it intersects the concave parabola (402). Alternatively, the edge of the concave parabola (402) may be directly above a point either to the left or to the right of the common parabolic focus (406). Where the edge of the concave parabola (402) is above a point to the left of the common parabolic focus (406), rays hitting the edge from an infinitely distant point along the negative z-axis will reflect toward the convex parabola (404) at greater than a 90-degree angle from the z-axis, where the angle with the z-axis is measured from positive z toward the ray. Where the edge of the concave parabola (402) is above a point to the right of the common parabolic focus (406), rays hitting the edge from an infinitely distant point along the negative z-axis will reflect toward the convex parabola (404) at less than a 90-degree angle from the z-axis.

FIG. 4B shows the same pair of parabolas (402 and 404) displaced toward the optical axis (the z-axis), in the negative y direction, by an amount delta y (408). In an illustrative embodiment, delta y is chosen such that the entireties of both optical surfaces are used. Specifically, delta y is chosen such that the z-axis intersects the convex parabola (404) at the same point as do rays hitting the edge of the concave parabola (402) from an infinitely distant point along the negative z-axis. In the illustrative embodiment shown in FIG. 4A-4C, delta y is the height of the convex parabola (404) at the point directly below the edge of the concave parabola (418).

After displacing the parabolas (402 and 404) toward the z-axis by delta y, the portions of both parabolas falling below the z-axis are discarded. This leaves just the two parabolic segments lying within the z-y plane—a concave parabolic segment (412) and a convex parabolic segment (414), both residing above the z-axis (in the positive y direction). Rotating the assembly of these two parabolic segments about the z-axis forms a pair of matched CoRs which can be configured as a beam director having no light loss from the central obscuration when used as a projection system.

FIG. 4C shows the intersection (416) of the concave parabolic segment (412) and the convex parabolic segment (414) and the edge (418) of the concave parabolic segment (412). In an illustrative embodiment, the distance $z_i$ from the z-axis of the intersection (416) is one-third of the distance $z_e$ from the z-axis to the edge (418). One of skill in the art will recognize that the relative steepness of the parabolas can be arbitrarily adjusted by moving the directrix of either parabola closer or further away from the common parabolic focus (406). The above description is an explanation of the mathematical properties of an illustrative system having multiple CoRs, and is not meant to limit the means for constructing or designing the system. One of skill in the art will recognize that the same illustrative system can be described, designed, or constructed in a variety of ways and/or sequences of mathematical and geometric steps.

FIGS. 5A-5C show an alternate embodiment in which the distance $z_i$ from the z-axis of the intersection between the two CoRs (516) is approximately one-eighth of the distance $z_e$ from the z-axis to the edge (518). Furthermore, FIGS. 5A-5C also illustrate an embodiment in which the edge (518) of the concave parabolic segment (512) resides somewhere other than directly above the common parabolic focus. As illustrated in FIGS. 5A-5C, rays hitting the edge (518) from an infinitely distant point along the negative z-axis will reflect toward the convex parabola (514) at greater than a 90-degree angle from the z-axis.

FIG. 6 shows an illustrative embodiment of a pair of CoRs configured to act as a beam director for an input light source. A flat, elliptical "fold mirror" or "turning mirror" (602) situated at an angle (e.g., 45 degrees) to the optical axis (604) reflects light from a laser source (606) onto the surface of the convex CoR (608). In an illustrative embodiment, the fold mirror (602) is configured such that its cross-section within the x-y plane is substantially identical to that of the convex CoR (608). The concave CoR (610) intercepts all of the light reflected from the laser source (606) through the fold mirror (602) and convex CoR (608). The concave CoR (610) substantially collimates the expanded beam, projecting it out along the negative z direction as shown.

For a laser weapon director or a laser communication system, this configuration offers many advantages. First, because little or no light from the center of the beam is lost, as would be the case with centrally obscured telescopes, this approach is maximally efficient (i.e., it utilizes substantially the entirety of the light energy emanating from the laser source (606)). Next, by forming both the convex CoR (608) and the concave CoR (610) from a single substrate, the two matched CoRs (608 and 610) may be manufactured in a substantially pre-aligned configuration, such that little or no maintenance alignment will be necessary. For example, both surfaces shown in FIG. 6 may be "diamond machined" or "diamond turned" onto a single substrate using one setup to form the CoR surfaces. Alternatively, the surfaces may be formed using electrical discharge machining ("EDM"). Diamond machining, diamond turning, and EDM are known to one of skill in the art and would minimize the potential for alignment errors between the two matched CoRs (608 and 610). Single-substrate diamond machining of the two matched CoRs (608 and 610) also makes the surfaces unlikely to become unaligned even under extremely rugged use, while providing for a naturally ultra-lightweight optical metering structure. Furthermore, the fold mirror (602) can be moved very close to the convex CoR (608) to achieve an extremely compact aspect ratio. Lastly, the aspect ratio of input and output beam diameters is determined by the ratio of base curvatures of the two matched CoRs, allowing wide variation and selectability.

Figure 7:
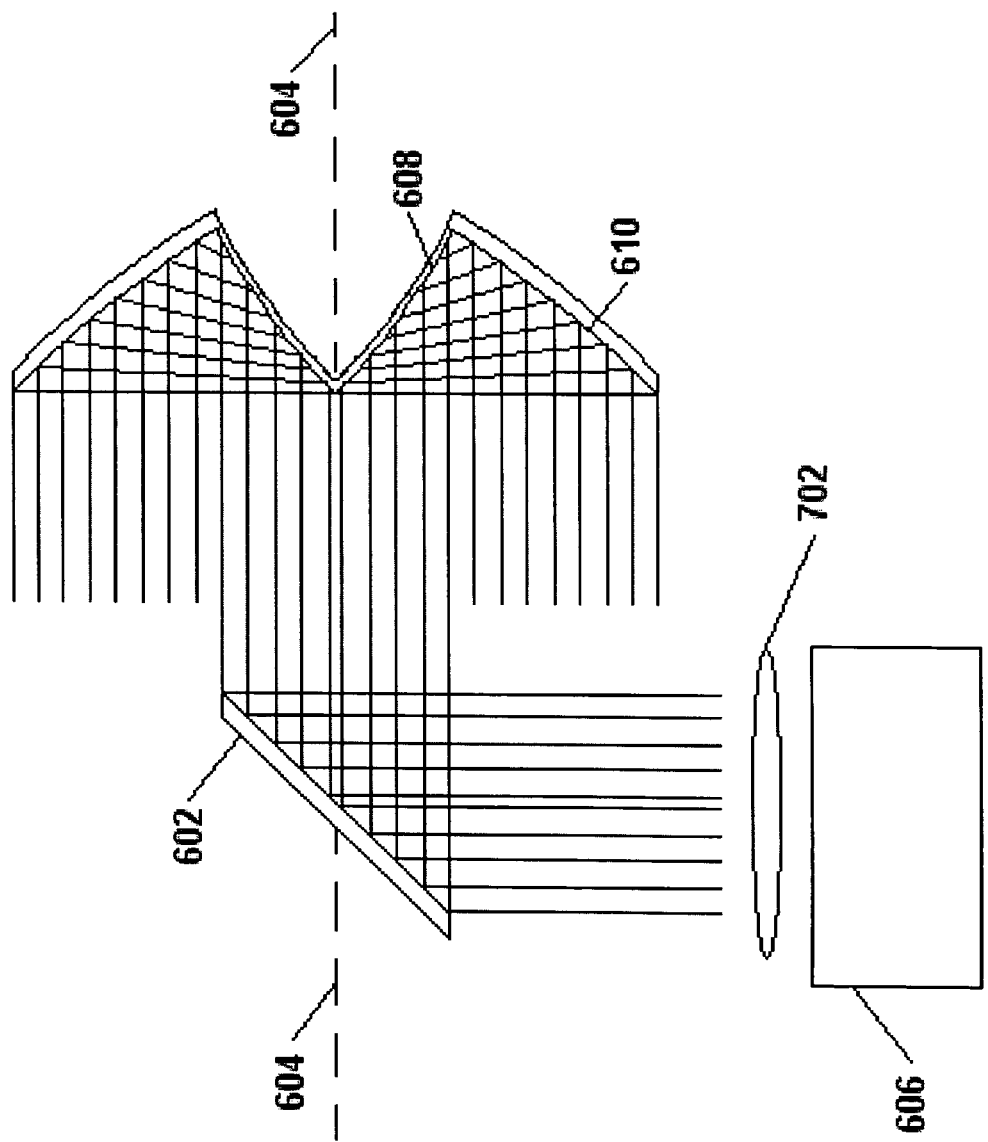
FIG. 7 is an application of matched CoRs as a variable focus beam director.

FIG. 7 shows an embodiment of the matched CoR system shown previously in FIG. 6, but with mild focus optics (702) added between the light source (606) and the beam expander. One of skill in the art will appreciate that the mild focus optics (702) may be either fixed or variable. In an illustrative embodiment, the focus optics (702) may be very weak positive and/or negative powered lenses used alone or in combination. Adding optics (702) enables projecting the light from the matched CoR system to an optimum beam focus located at a selected, and even variable, distance along the negative z direction. For example, if the optics (702) are a positive lens and negative lens separated by a variable distance, the distance to the beam focus may be changed by adjusting the distance between the optics thereby varying their combined optical power. In an illustrative embodiment, the focus optics are of low optical power such that they cause only negligible aberration when used with the matched CoRs.

One of skill in the art will recognize that with minor modifications the beam director system shown in FIG. 6 or FIG. 7 may be used as a telescope. Specifically, the laser source (606) would be replaced by viewing optics suitable for use with a human eye, a camera, or other light detecting apparatus. Light rays from an object located a great distance away along the negative z-axis will hit the concave CoR (610) substantially parallel to the z-axis. Upon hitting the concave CoR (610), those light rays would be reflected toward the convex CoR (608) and would contact the turning mirror (602) in rays that are also substantially parallel to the z-axis. The turning mirror (602) would then direct those light rays toward the viewing optics (702). In accordance with FIG. 7, additional optics (707) could be used to vary the beam focus of the telescope.

In FIGS. 6 and 7, the fold mirror (602) is shown to be at approximately 45 degrees from the z-axis, such that light from the laser source (606) contacts the fold mirror (602) at approximately a 90-degree angle from the z-axis. One of skill in the art will appreciate that the fold mirror (602) could alternatively be designed to direct light at an angle other than 90 degrees from the z-axis. For example, the fold mirror could be designed to collect laser light from a laser source located near or at the edge of the concave CoR (610). It might then be possible to build a mount for the laser source (606) and/or the optics (702) that shared the same substrate as the pair of CoRs (610 and 608). In an illustrative embodiment, the fold mirror (602) is designed and configured so as to match the outer contour of the convex CoR (608) in the x-y plane or the inner contour of the concave CoR (610). In an illustrative embodiment, the fold mirror (602) is also designed and configured so as to present a substantially circular contour when viewed from the laser source (606) and/or the optics (702).

FIGS. 8A-8D illustrate construction of a beam director using a parabolic primary CoR (802) and a matching hyperbolic secondary CoR (804). In an illustrative embodiment, the pair of matched CoRs is formed so as to have no light loss by central obscuration when used as a projection system. As described below, the beam director of FIG. 8D could be constructed from a single reflective substrate. In one direction, this beam director could be used to expand and project a laser weapon. In the opposite direction, this beam director could be used as a telescope.

The CoRs are matched by designing them such that both CoRs have the same diameter focal locus, such that when properly positioned with respect to each other, their respective loci precisely coincide in space. FIG. 8A is a 1-dimensional illustration of a concave parabolic primary (802) and a convex hyperbolic secondary (804). A hyperbola is constructed according to equation 1, in which k is less than −1. Both the parabolic primary (802) and the hyperbolic secondary (804) are positioned so as to have a common focus in space (806).

In an illustrative embodiment, the parabolic primary (802) extends from the z-axis to an edge immediately above its parabolic focus (806), and the hyperbolic secondary (804) extends from the z-axis until it intersects the parabolic primary (802). Alternatively, the edge of the parabolic primary (802) may be directly above a point either to the left or to the right of the common parabolic focus (806). Where the edge of the parabolic primary (802) is above a point to the left of the common parabolic focus (806), rays hitting the edge from an infinitely distant point along the negative z-axis will reflect toward the hyperbolic secondary (804) at greater than a 90-degree angle from the z-axis, where the angle with the z-axis is measured from positive z toward the ray. Where the edge of the parabolic primary (802) is above a point to the right of the common parabolic focus (806), rays hitting the edge from an infinitely distant point along the negative z-axis will reflect toward the hyperbolic secondary (804) at less than a 90-degree angle from the z-axis.

As shown, rays hitting the parabolic primary (802) from an infinitely distant point are ultimately reflected to the virtual focus (810) of the hyperbolic secondary (804). Note: in optics when the rays never encounter the focus it is defined as "virtual" and when they actually emanate from or pass through the focus, it is defined as "real."

FIG. 8B shows the profiles for the same pair of CoRs (802 and 804) displaced toward the optical axis (the z-axis), in the negative y direction, by an amount delta y (808), and modified so that the real focus of the hyperbolic secondary (804) is moved upwards in the positive y direction by the same delta y (808). The real focus of the hyperbolic secondary (804) is moved along an arc (820) by rotating the hyperbolic secondary (804) about its virtual focus (806), which it shares in common with the parabolic focus (806) until its real focus lies at a point (822) that is displaced in the positive y direction by the amount delta y (808). In an illustrative embodiment, delta y is chosen such that the entireties of both optical surfaces (802 and 804) lying above delta y (808) are used by light emanating from an infinitely distant source reflected from the parabolic primary (802). Specifically, delta y is chosen such that when the pair of CoRs (802 and 804) are moved downward by delta y, the z-axis intersects the hyperbolic secondary (804) at the same point (824) as do rays hitting the top edge of the parabolic primary (802) from an infinitely distant point along the negative z-axis. In the illustrative embodiment shown in FIGS. 8A and 8B, this point (824) is directly below the top edge of the parabolic primary (802). In other words, in an illustrative embodiment, rays hitting the top of the parabolic primary (802) from an infinitely distant point along the negative z-axis are directed straight down at a right angle. Alternatively, the pair of matched CoRs (802 and 804) could be configured so that rays hitting the top edge of the parabolic primary (802) from an infinitely distant point along the negative z-axis are reflected at greater than a right angle (e.g., similar to the configuration shown in FIGS. 5A to 5C) or at less than a right angle.

After displacing the profiles for the modified pair of CoRs (802 and 804) toward the z-axis by delta y, the portions of both curves falling below the z-axis are discarded. This leaves just the two curve segments lying within the z-y plane above the z-axis—a concave parabolic segment (812) and a convex hyperbolic segment (814), both residing above the z-axis as shown in FIG. 8C. Rotating the assembly of these two conic segments (812 and 814) about the z-axis forms a pair of matched CoRs which can be configured as a beam director having no light loss from the central obscuration when used as a projection system.

FIG. 8C shows the intersection (816) of the concave parabolic segment (812) and the convex hyperbolic segment (814) and the edge (818) of the concave parabolic segment (812). In an illustrative embodiment, the distance $z_i$ from the z-axis of the intersection (816) is one-third of the distance $z_e$ from the z-axis to the edge (818). One of skill in the art will recognize that the relative steepness of the parabolas can be arbitrarily adjusted by changing parameters of either curve, for example by moving the directrix of the parabolic primary closer or further away from the common parabolic focus (806). The above illustrative description of how to define or design matched CoRs is not the only way to define or design the system. One of skill in the art will recognize that the same illustrative system can be described, designed, or constructed using a variety of different ways and/or sequences of mathematical and geometric steps.

FIG. 8D shows an illustrative embodiment of the pair of CoRs formed by rotating the curves shown in FIG. 8C about the z-axis and configured to act as a beam director for an input source light. A flat, elliptical "fold mirror" or "turning mirror" (830) situated at an angle (e.g., 45 degrees) to the optical axis (832) reflects light from a light source (not shown) onto the surface of the convex CoR (814). In an illustrative embodiment, the fold mirror (830) is configured such that its cross-section within the x-y plane is substantially identical to that of the convex CoR (814). The concave CoR (812) intercepts all of the light reflected from the light source through the fold mirror (830) and convex CoR (814). The concave CoR (812) substantially collimates the expanded beam, projecting it out along the negative z direction as shown.

Though the illustrative embodiments are described in terms of light sources and reflecting light, the embodiments described herein may be used to direct other wave types of energy than light energy. For example, the embodiments described herein describe principles which may be suitable for directing radio energy, water waves, phonons, gravity waves, etc.

FIGS. 9A and 9B show an illustrative embodiment of a pair of matched CoRs diamond machined into a single, monolithic substrate for use in a telescope or beam director. FIG. 9A is a view of the matched CoRs as viewed from the negative z-axis, and FIG. 9B is a side view of the same pair of matched CoRs. The drawing shows a rough shape which could be machined into any material which is capable of being diamond machined. The front surfaces are cut to the approximate curvature of the final CoRs using standard machining techniques and then precisely diamond machined to the final CoR surface. In an illustrative embodiment, the rest of the shape satisfies 3 initial requirements: 1) it is of sufficient rigidity to maintain the optical surfaces under the intended conditions of use (this will determine such things as minimum thickness and lowest allowable weight, 2) it is able to be mounted to a vacuum chuck or other fixture to affix the substrate for diamond machining and, 3) it is made from a material which can be diamond machined to a finished optical surface, such as aluminum, beryllium, nickel, and numerous alloys. In addition, one of skill in the art will appreciate that many materials can be used with aluminum, beryllium, or other alloys deposited onto the base material. Then the final diamond machined surface can be turned into the deposited material. This rough shape is mounted to a diamond turning machine and both CoR surfaces are turned into the substrate without removal from the initial mounting. The result is one structure having an outer concave primary mirror (910) and an inner convex secondary mirror (908), both CoRs which have equal diameter focal loci and configured such that those loci coincide in space. Note also that a relief (914) is machined between inner and outer CoR so as to allow for working room when machining the two surfaces. The final finishing of the matched CoR's can be the bare diamond turned surface or can include a deposited optically-reflective coating for the intended wavelengths of use. For example, if used for visible light, matched CoR's with optical surfaces diamond machined in bare aluminum will exhibit excellent optical reflectivity without the necessity of a deposited coating.

One of skill in the art will appreciate that, although at least one embodiment disclosed herein teaches forming one or more CoRs from a solid, continuous substrate, the techniques described herein may also be applied to non-continuous material such as various forms of metal mesh or grids suitable for use in constructing large dish structures used to guide electromagnetic radio waves. For example, the CoR techniques described herein may be used to construct a relatively compact radio telescope having little or no central obscuration. Furthermore, a CoR or matched pair of CoRs need not be continuous throughout all 360-degrees around the z-axis. For example, a single CoR or matched pair of CoRs that is continuous throughout 360 degrees about the z-axis may be divided along a plane containing the z-axis into two separate 180-degree structures.

The figures and principles defined herein may be applied to other embodiments without departing from the spirit or scope of the invention. For example, though embodiments are described with respect to ability to direct light energy, the techniques and structures described herein may also be applied to non-visible and/or non-light energy, such as electromagnetic and radio frequency energy. Thus, the present invention is not intended to be limited to the embodiments shown herein but is to be accorded the widest scope consistent with the principles and novel features disclosed herein.

What is claimed is:

1. An apparatus comprising: a concave surface formed along a first conic curve segment rotated about a z-axis of symmetry, the first conic curve, offset from the z-axis by an offset distance, having a first focus on the opposite side of the z-axis from the first conic curve.

2. The apparatus of claim 1 wherein the first concave curve is a parabola.

3. The apparatus of claim 2 wherein the loci of foci is circular in shape.

4. The apparatus of claim 1 wherein the concave surface is formed to reflect energy traveling along a path that is parallel to the z-axis onto a loci of foci that is elliptical in shape.

5. The apparatus of claim 1 further comprising a convex surface formed along a second conic curve extending from, and rotated about, said z-axis, the second conic curve having a real focus lying substantially on the z-axis and having a virtual focus that is coincident with said first focus.

6. The apparatus of claim 5 wherein the second conic curve is hyperbolic, and wherein the second conic curve matches the first conic curve such that the second conic curve is configured to direct energy emanating from a point source located at a point location lying on the z-axis in a positive z direction toward the first conic curve such that the first conic curve directs the energy in a direction parallel to the z-axis in a negative z direction.

7. The apparatus of claim 6 wherein the concave surface and the convex surface are formed into the single material substrate using diamond-turning.

8. The apparatus of claim 6 wherein the concave surface and the convex surface are formed into the single material substrate using diamond machining.

9. The apparatus of claim 6 wherein the concave surface and the convex surface are formed into the single material substrate using electrical discharge machining.

10. The apparatus of claim 6 wherein the concave surface and the convex surface are formed into the single material substrate using diamond-turning.

11. The apparatus of claim 6 wherein the concave surface and the convex surface are formed into the single material substrate using diamond machining.

12. The apparatus of claim 6 wherein the concave surface and the convex surface are formed into the single material substrate using electrical discharge machining.

13. The apparatus of claim 6 wherein the concave surface and the convex surface are formed into the single material substrate using diamond-turning.

14. The apparatus of claim 6 wherein the concave surface and the convex surface are formed into the single material substrate using diamond machining.

15. The apparatus of claim 6 wherein the concave surface and the convex surface are formed into the single material substrate using electrical discharge machining.

16. The apparatus of claim 5 wherein the second conic curve is parabolic, and wherein the second conic curve matches the first conic curve such that the second conic curve is configured to direct energy traveling parallel to the z-axis in a positive z direction toward the first conic curve such that the first conic curve directs the energy in a direction parallel to the z-axis in a negative z direction.

17. The apparatus of claim 5 wherein the concave surface and the convex surface are formed into a single material substrate.

18. The apparatus of claim 5 wherein the concave surface and the convex surface are radially symmetrical about the z-axis.

19. The apparatus of claim 18 wherein the convex surface and concave surface are formed by diamond-turning.

20. The apparatus of claim 5 wherein the combination of the concave surface and the convex surface have substantially no central obscuration.

21. The apparatus of claim 5 further including a fold mirror having a profile that, from the negative z direction, fills up substantially the entire profile of the convex surface.

22. The apparatus of claim 21 further including optics configured between the fold mirror and a light source.

23. The apparatus of claim 21 further including optics configured between the fold mirror and an eyepiece.

24. The apparatus of claim 21 further including optics configured between the fold mirror and a light source.

25. The apparatus of claim 21 further including optics configured between the fold mirror and an eyepiece.

26. The apparatus of claim 21 further including optics configured between the fold mirror and a light source.

27. The apparatus of claim 21 further including optics configured between the fold mirror and an eyepiece.

28. The apparatus of claim 5 wherein the point furthest from the z-axis of each of the second pair of conic curves is located at a distance from the z-axis that is approximately one third of the distance from the z-axis of the point of each of the coplanar first pair of conic curves located furthest from the z-axis.

29. The apparatus of claim 5 wherein the point at which the convex surface intersects the z-axis is located at substantially the same position along the z-axis as an edge of the concave surface located the furthest distance from the z-axis.

30. The apparatus of claim 5 wherein the first conic curve is parabolic and the second conic curve is hyperbolic.

31. The apparatus of claim 5 wherein the first conic curve is parabolic and the second conic curve is parabolic, and wherein the real focus is on the z-axis at an infinite distance from the second conic curve.

32. A method comprising:
reflecting energy off a concave surface formed along a first conic curve segment ending at, and rotated about, a z-axis of symmetry, the first conic curve having a first focus on the opposite side of, and offset from, the z-axis by an offset distance; and
reflecting said energy off a convex surface formed along a second conic curve rotated about said z-axis of symmetry, the second conic curve segment having a real focus lying substantially on the z-axis and a virtual focus that is coincident with said first focus.

33. The method of claim 32 wherein the concave surface and the convex surface are formed into a single material substrate.

34. The method of claim 32 wherein the concave surface and the convex surface are radially symmetrical about the z-axis.

35. The method of claim 34 wherein the concave surface and concave surface are formed by diamond-turning.

36. The method of claim 32 wherein the combination of the concave surface and the convex surface have substantially no central obscuration.

37. The method of claim 32 further including reflecting said energy off a fold mirror having a profile that, viewed from an infinite point along the z-axis, fills up substantially the entire profile of the convex surface.

38. The method of claim 32 wherein the point furthest from the z-axis of the second conic curve is located at a distance from the z-axis that is approximately one third of the distance from the z-axis of the point of the first conic curve located furthest from the z-axis.

39. The method of claim 32 wherein the point at which the convex surface intersects the z-axis is located at substantially the same position along the z-axis as an edge of the concave surface located the furthest distance from the z-axis.

40. The method of claim 32 wherein the first conic curve is parabolic and the second conic curve is parabolic, wherein the virtual focus is on the z-axis at an infinite distance from the second conic curve.

41. The method of claim 32 wherein the first conic curve is parabolic and the second conic curve is parabolic, and wherein the real focus is on the z-axis at an infinite distance from the second conic curve.

* * * * *